United States Patent [19]
Maeda

[11] Patent Number: 4,881,188
[45] Date of Patent: Nov. 14, 1989

[54] BINARY CODING CIRCUIT

[75] Inventor: Naoki Maeda, Osaka, Japan

[73] Assignee: Sumitomo Electric Industries, Ltd., Osaka, Japan

[21] Appl. No.: 125,680

[22] Filed: Nov. 25, 1987

[30] Foreign Application Priority Data

Nov. 27, 1986 [JP] Japan .................................. 61-285337

[51] Int. Cl.$^4$ .............................................. G06F 7/56
[52] U.S. Cl. .................................................. 364/713
[58] Field of Search ............................. 364/713, 837; 235/462–463, 465, 470, 454; 382/65, 50

[56] References Cited

U.S. PATENT DOCUMENTS

| | | | |
|---|---|---|---|
| 4,180,800 | 12/1979 | Isshiki et al. ......................... | 340/146 |
| 4,335,301 | 6/1982 | Palmer et al. ........................ | 235/462 |
| 4,402,087 | 8/1983 | Sakamoto et al. .................... | 382/53 |
| 4,402,088 | 8/1983 | McWaters et al. ................... | 235/462 |
| 4,517,455 | 5/1985 | Benitez et al. ....................... | 235/462 |

Primary Examiner—Gary V. Harkcom
Assistant Examiner—Long T. Nguyen
Attorney, Agent, or Firm—Sughrue, Mion, Zinn, Macpeak & Seas

[57] ABSTRACT

A binary coding circuit for binary coding the output of a photoelectric conversion element in an optical character reader. A parent signal generating circuit produces a binary coding parent signal and a threshold parent signal in response to the output of the photoelectric conversion element. The binary coding parent signal is applied to a binary coding signal amplifier circuit group inclusive of N amplifier circuits having different amplification factors and different offset levels, while the threshold parent signal is applied to a threshold signal amplifier circuit group having M amplifier circuits also having different amplification factors and different offset levels, N and M being positive integers. The outputs of each of the N and M amplifier circuits are individually compared by a comparison circuit group including L comparison circuits, where L is a positive integer satisfying MAX (M, N)$\leq$L$\leq$MN.

3 Claims, 3 Drawing Sheets

IMAGE OF B1

IMAGE OF B2

IMAGE OF B3

BINARY CODING CIRCUIT

BACKGROUND OF THE INVENTION

The present invention relates to analog signal binary coding circuits, and more particularly to a binary coding circuit for quantizing the output of a photoelectric conversion element in an optical character reader adapted to optically convert characters or codes into a binary signal having two signal levels corresponding to a background region and a character or code region.

The term "character" as used herein is intended to means alphabets and character sets of all languages, numerals, etc. The term "code" as used herein is intended to mean bar codes, etc.

Such characters and codes are, in general, printed in black ink on a white printing sheet. The contrast between black and white permits distinguishing the characters and codes from the background. The printing sheet is not always white, however. Nevertheless, even in the case where the characters or codes are printed on colored sheets, the characters or codes can usually be clearly distinguished from the background.

Hereinafter, the part of a sheet where a character or code is printed or written will be referred to as "a character region", and the part of a sheet where nothing is printed or written will be referred to as "a background region". In addition, characters, numerals and codes will all be referred to as merely "characters", and a device for optically reading characters on a sheet will be referred to as "an optical character reading unit" or "optical character reader".

In a conventional optical character reader, the surface of a sheet on which characters are written or printed is scanned with a photoelectric conversion element, the outputs of the latter is converted into binary signals corresponding to character and background regions, and the binary signals are utilized to identify the characters.

In this operation, the surface of the sheet is irradiated by a light source, and light reflected from the surface of the sheet is applied through a lens system to the photoelectric conversion element, which generates an electrical signal in correspondence to the quantity of light incident thereon. The quantity of light incident on the photoelectric conversion element changes with the characters on the surface of the sheet. Since usually the character region is black while the background region is white, the quantity of light reflected, i.e., the intensity of light incident on the photoelectric conversion element, depends on the presence or absence of characters on the surface of the sheet.

Characters on a sheet are not, however, uniform in density, and accordingly, the analog output of the photoelectric converter element scanning the surface of the sheet is not precisely a binary signal; that is, it changes continuously and irregularly. Even in the case of characters printed by type, vertical lines are often different in width from horizontal lines in the character, and different characters have different numbers of strokes. Thus, the output of the photoelectric conversion element changes in multiple analog modes. Furthermore, it changes with time and changes spatially. That is, the output of the photoelectric conversion element is an analog signal which takes not only a maximum value and a minimum value for character and background regions, but also various values therebetween.

The simplest method of binary coding such an analog density signal is to compare its signal level with a predetermined threshold level so that an output "1" or "0" is produced according to whether or not the signal level is higher than the threshold level. However, this method sometimes suffers from a difficulty that a character region can sometimes be determined erroneously as a background region, i.e., a character is not completely detected, or a background region detected as a character region, so that lines of a detected characters appear to overlap with one another. Accordingly, identification of characters and codes according to data binary coded by the above-described method is unavoidably in correct.

The reason why a character is not completely detected or its lines appear to overlap as described above resides in the use of a fixed threshold level for binary coding. Thus, the above-described method is applicable only to simple characters.

In order to overcome the above-described difficulty, a binary coding circuit has been proposed in which the threshold level changes with the output of the photoelectric conversion element. More specifically, the threshold level is so controlled that, when a character of a binary coded image is liable to be deformed because of a large difference in level between the background region and the character region, the binary coded image is made thinner, and when a character of a binary coded image is liable to be partially missed, the binary coded image is made thicker. Therefore, the binary coding circuit can binary code characters with high accuracy even if the characters differ in density to some extent.

No one threshold variation is most suitable for every kind and density of characters. However, in practice, since a character identifying section carrying out subsequent processing can identify an input binary coded image which is somewhat deformed in configuration, even if only one threshold level setting reference is provided for the binary coding circuit, the range of character densities is often sufficient for the binary coding circuit to correctly identify the characters.

However, it is generally difficult for the conventional binary coding circuit to provide optimum threshold levels for all characters of different densities by analog processing. Especially it is difficult for a binary coding circuit to binary code both extremely thick and dark characters and extremely thin and light characters satisfactorily. Even if it were possible for the circuit to do so, the operation often would be low in stability. Sometimes the best threshold level cannot be obtained, depending on the characteristics of the photoelectric conversion element employed.

SUMMARY OF THE INVENTION

In view of the foregoing, an object of the invention is to provide a binary coding circuit having a simple circuitry arrangement which can binary code characters in a wide range of densities with high stability.

The foregoing object of the invention has been achieved by the provision of a binary coding circuit for binary coding an output of a photoelectric conversion element in an optical character reading unit adapted to optically read characters which, according to the invention, comprises: a parent signal generating circuit receiving an output of the photoelectric conversion element and generating a binary coded parent signal and a threshold parent signal; a binary coding signal amplifier circuit group to which the binary coded parent signal is applied, the binary coding signal amplifier circuit comprising N amplifier circuits (where N is a positive integer) having different amplification factors and different offset levels; a threshold signal amplifier circuit group to which the threshold parent signal is applied, the threshold signal amplifier circuit group comprising M amplifier circuits (where M is a positive integer) having different amplification factors and different offset levels; and a comparison circuit group comprising L comparison circuits (where L is a positive integer satisfying MAX (M, N)$\leq$L$\leq$MN), in each of which one of the outputs of the amplifier circuits in the binary coding signal amplifier circuit group and one of the outputs of the amplifier circuits in the threshold signal amplifier circuit group are subjected to comparison to provide a binary coded signal.

DESCRIPTION OF THE PREFERRED EMBODIMENTS

A preferred embodiment of a binary coding circuit of the invention will be described with reference to the drawings.

For simplification in description, it is assumed that the output of a photoelectric conversion element increases in level for a black background. That is, for instance, in a signal $S_1$ to be binary coded (hereinafter referred to as "a binary coding signal $S_1$" when applicable) the higher level represents a black background and the lower level a white background.

Figure 1:
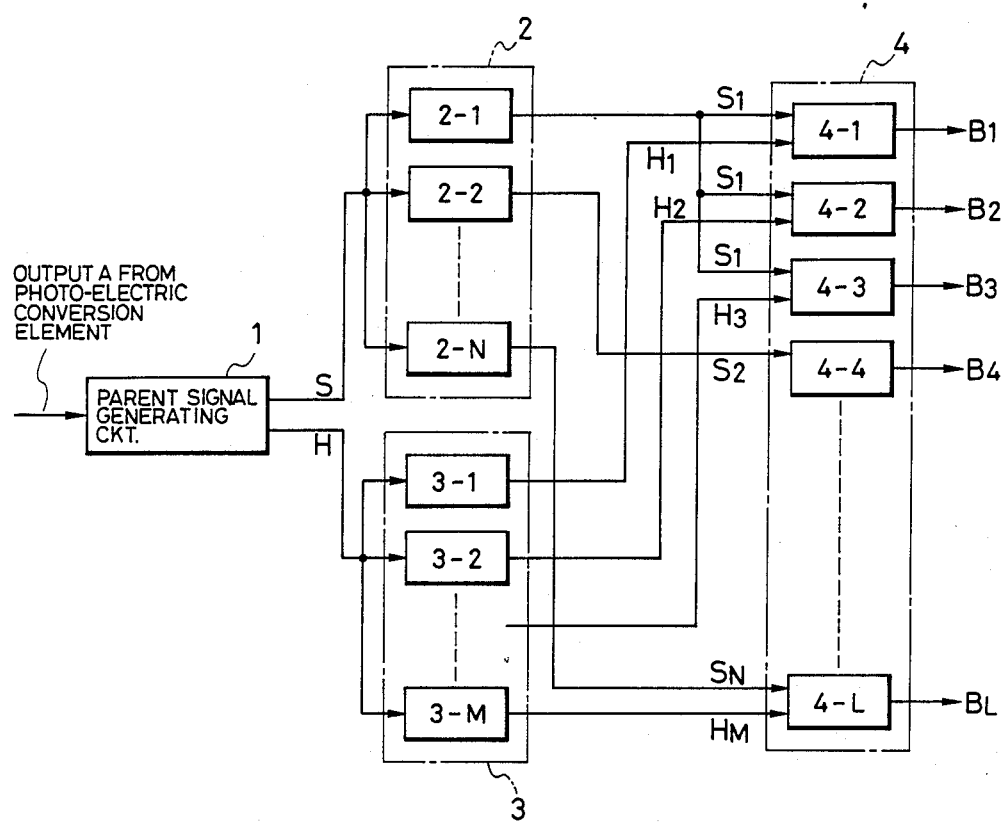
FIG. 1 is a block diagram showing the basic arrangement of a binary coding circuit according to the invention.

With reference to FIG. 1, a parent signal generating circuit 1 receiving the photoelectric conversion output A of an optical character reading unit outputs a parent signal S to be binary coded and a threshold parent signal H. These parent signals S and H are applied to a binary coding signal amplifier circuit group 2 and a threshold signal amplifier circuit group 3, respectively. The binary coding signal amplifier circuit group 2 includes amplifier circuits 2-i (i=1 through N) which amplify the parent signal S with different amplification factors and offset it with different offset levels to output respective binary coding signals $S_i$. Similarly, the threshold signal amplifier circuit group 3 is composed of amplifier circuits 3-j (j=1 through M) which amplify the threshold parent signal H with different amplification factors and offset it with different offset levels to output respective threshold signals $H_j$.

The binary coding signals $S_i$ and the threshold signals $H_j$ are applied to comparison circuits 4-k (k=1 through L) forming a comparison circuit group 4. That is, one of the comparison circuit 4-k receives a respective one of the binary coding signals $S_i$ and one of the threshold signals $H_j$. Therefore, the number of combinations of the binary coding signals $S_i$ and the threshold signals $H_j$ which are applied to the comparison circuits 4-k is MN. The comparison circuits 4-k of the comparison circuit group 4 subject the binary coding signals $S_1$ and the threshold signals $H_j$ to comparison to output binary coded output $B_k$ (k=1 through L) representing whether or not the signals $S_i$ are higher than the respective signals $H_j$. Each of the binary coded outputs $B_k$ has a high level when the signal ($S_i$) is higher than the signal ($H_j$), thus indicating that the part of a sheet then scanned by the photoelectric conversion element should be determined as black.

For instance, in the case of FIG. 1, the output $S_1$ of the amplifier circuit 2-1 in the binary coding signal amplifier circuit group 2 is applied to first input terminals of the comparison circuits 4-1, 4-2 and 4-3, and the threshold signal outputs $H_1$, $H_2$ and $H_3$ of the amplifier circuits 3-1, 3-2 and 3-3 are applied to second input terminals of the comparison circuits 4-1, 4-2 and 4-3, respectively. The comparison circuits 4-1, 4-2 and 4-3 compare the binary coding signal $S_1$ with the threshold signals $H_1$, $H_2$ and $H_3$ to provide binary coded outputs $B_1$, $B_2$ and $B_3$, respectively, as shown in FIG. 3.

Figure 2:
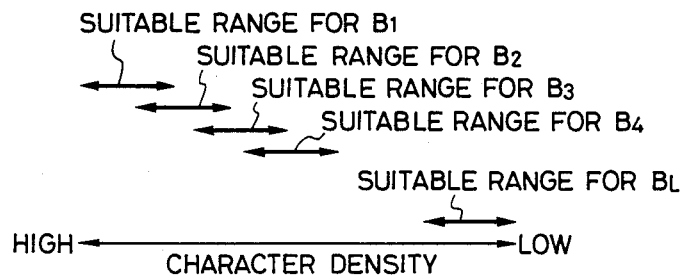
FIG. 2 is an explanatory diagram for a description of character density ranges suitable for binary coded outputs.
Figure 3A:
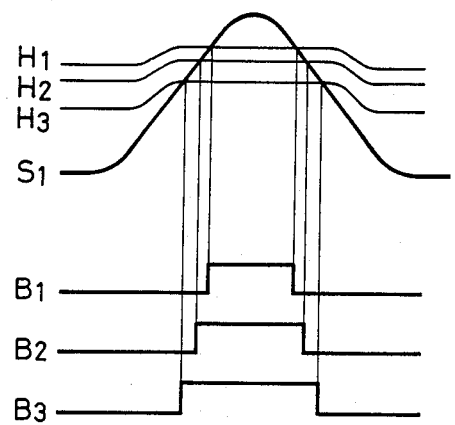
FIG. 3A is a waveform diagram showing examples of binary coded outputs.
Figure 3B:
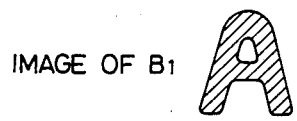
FIG. 3B is an explanatory diagram showing examples of images identified with different binary coded outputs.
Figure 3B:
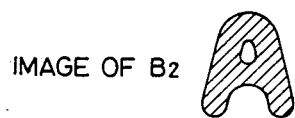
Figure 3B:
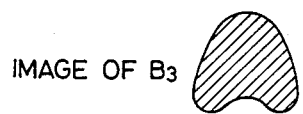

If the binary coded output $B_1$ is best as a binary coded circuit output level for a character read by a photoelectric conversion element, then for the binary coded output $B_2$ the output image has a greater line thickness, and with the binary coded output $B_3$ the line thickness is so great that the output image cannot be substantially read or identified (see FIGS. 3A and 3B). Therefore, with respect to the densities of the characters to be read, suitable ranges are assigned to the binary coded outputs $B_k$ so that the latter $B_k$ can provide the best image outputs (or the best identification results), as shown in FIG. 2. In the case of FIG. 2, the higher in density a character to be read, the closer to $B_1$ will be the binary coded output selected (or the lower in density a character to be read, the closer to $B_L$ the binary coded output selected). In this connection, it is preferable that the applicable ranges (the density ranges which can be binary coded with the outputs) of the L binary coded outputs $B_k$ overlap one another, as indicated in FIG. 2. Theoretically, it is unnecessary to overlap the density ranges. However, in practice, the probability of erroneous identification is high in the end portions of each of the applicable density ranges. Therefore, the density ranges are made to overlap with one another for an increase in reliability.

An example of a binary coding circuit according to the invention will be described with reference to FIG. 4.

Figure 4:
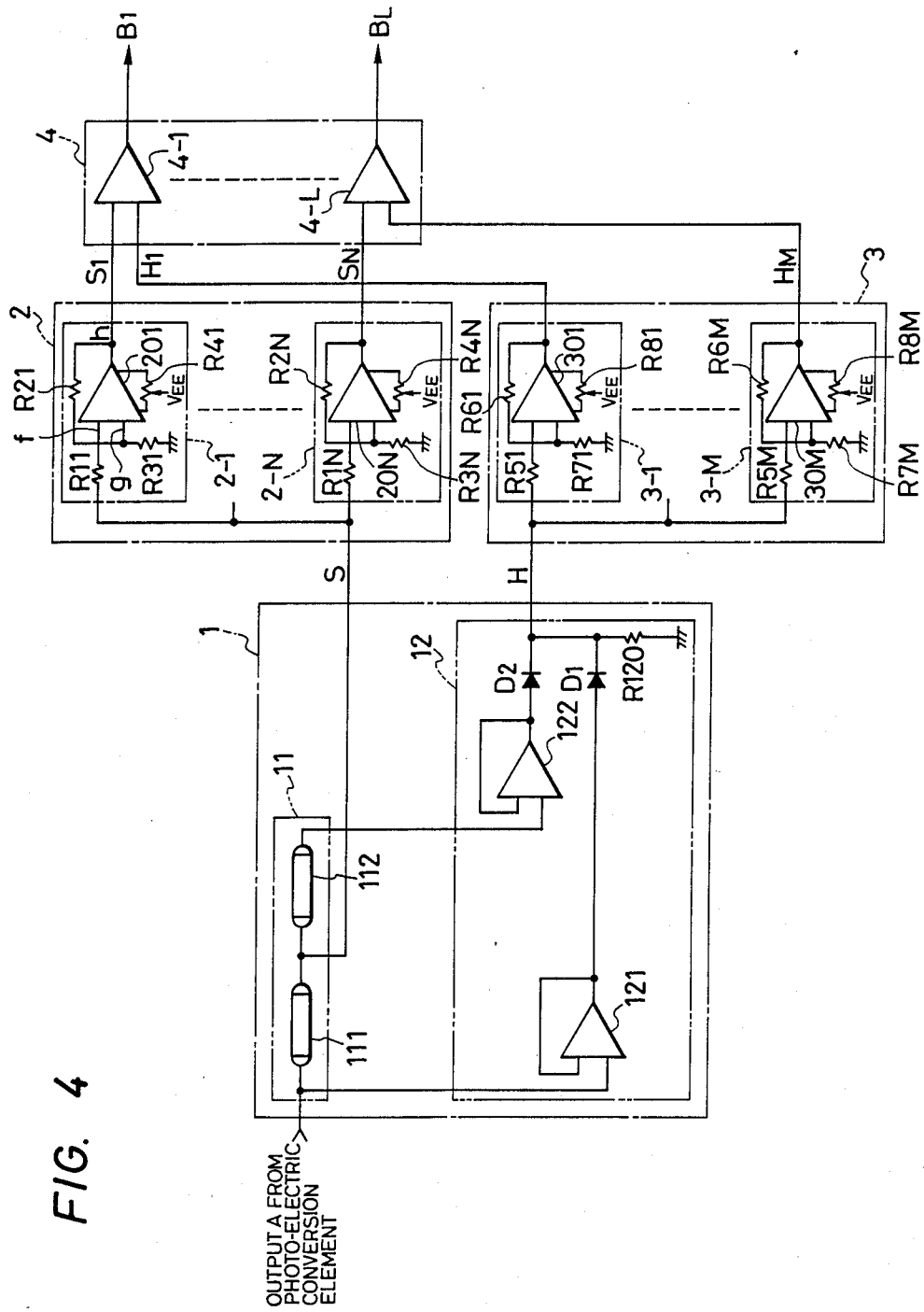
FIG. 4 is a circuit diagram showing an example of a binary coding circuit of the invention.

The binary coding circuit, as shown in FIG. 4, includes a parent signal generating circuit 1, a binary coding signal amplifier circuit group 2, a threshold signal amplifier circuit group 3, and a comparison circuit group 4. The parent signal generating circuit 1 is composed of a delay circuit 11 and an OR circuit 12. The binary coding signal amplifier circuit group 2 is made up of N amplifier circuits 2-i (i=1 through N). The threshold signal amplifier circuit group 3 includes M amplifier circuits 3-j (j=1 through M). The comparison circuit group 4 includes L comparison circuits 4-k (k=1 through L).

The delay circuit 11 includes a first delay line 111 having a delay time of $t_1$, and a second delay line 112 having a delay time of $t_2$. The signal provided by delaying a photoelectric conversion element output A by $t_1$ by the delay line 111 is applied as a binary coded parent signal S, to the binary coded signal amplifier circuit group 2. The OR circuit 12 is composed of amplifiers 121 and 122, diodes $D_1$ and $D_2$, and a resistor $R_{120}$. The logical sum of the signal obtained by amplifying the photoelectric conversion element output A with the amplifier 121 and the signal obtained by amplifying the output of the delay circuit 11 with the amplifier 122, which signal is provided by delaying the photoelectric conversion element output A by $t_1+t_2$ with the delay lines 111 and 112, is applied, as a threshold parent signal H, to the threshold signal amplifier circuit group 3.

In the binary coding signal amplifier circuit group 2, each of the amplifier circuits 2-$i$ is composed of an operational amplifier 20$i$, resistors R1$i$, R2$i$ and R3$i$, and a variable resistor R4$i$. Similarly, in the threshold signal amplifier circuit group 3, each of the amplifier circuits 3-$j$ includes an operational amplifier 30$j$, resistors R5$j$, R6$j$ and R7$j$, and a variable resistor R8$j$. The variable resistors R4$i$ and R8$j$ are used to adjust the offset levels, and are connected to a DC constant voltage $V_{EE}$.

The binary coding parent coding parent signal S is applied to the binary coding signal amplifier circuits 2-$i$. In each of the amplifier circuits 2-$i$, the binary coding signal S is applied through the resistor R1$i$ to the noninverting input terminal f of the operational amplifier 20$i$, and the output terminal h of the operational amplifier 20$i$ is connected through the resistor R2$i$ to the inverting input terminal g. The amplification factors $\pi_{2i}$ of the amplifier circuits 2-$i$ for noninverting amplification are as follows:

$$\pi_{2i} = \frac{R1i + R2i}{R1i}$$

where R1$i$ is substantially equal to R3$i$. Thus, the different amplifier circuits 2-$i$ amplify the binary coded parent signal S with different amplification factors and offset it with different offset levels to provide binary coded signals $S_i$ which are applied to the comparison circuit group 4.

Similarly, the amplification factors $\pi_{3j}$ of the amplifier circuits 3-$j$ in the threshold signal amplifier circuit group 3 are as follows:

$$\pi_{3j} = \frac{R5i + R6i}{R5i}$$

Thus, the different amplifier circuits 3-$j$ amplify the threshold parent signal H with different amplification factors and offset it with different offset levels, to output respective threshold signals $H_j$. The threshold signals $H_j$ are applied to the comparison circuit group 4. The binary coding signal amplifier circuit group 2 or the threshold signal amplifier circuit group 3 may include only one amplifier circuit; that is, M or N may be one (1).

The binary coded signals $S_i$ and the threshold signals $H_j$ are applied to comparison circuits 4-k (k=1 through L) in the comparison circuit group 4 in such a manner that each binary coded signal $S_i$ and a respective threshold signal $H_j$ are subjected to comparison in a corresponding, comparison circuit 4-k, which provides a binary coded output $B_k$ only when the binary coding signal $S_i$ is higher than the threshold signal $H_j$. With respect to the densities of the characters to be read, suitable density ranges are assigned to the various binary coded outputs $B_k$ so as to provide the best image outputs (and the best identification results). Selection of the binary coded outputs $B_k$ is effected by a processing circuit (such as an identifying circuit) in a later stage.

In the preferred embodiment, in order that, with the binary coded output $B_1$, a thick dark character can be satisfactorily binary coded, and, with the binary coded output $B_L$, a thin light character can be satisfactorily binary coded, and with the binary coded outputs $B_2$ through $B_{L-1}$ between the outputs $B_1$ and $B_L$ characters ranked in thickness and in darkness between the above-described two characters can be satisfactorily binary coded, the amplifier circuits 2-$i$ and 3-$j$ should be suitably adjusted in amplification factor and in offset level.

The binary coding circuit of the invention, having a simple circuit arrangement, can satisfactorily binary code characters in a wide range of densities, thus markedly improving the reading capacity of an optical character reader (OCR) or a bar code reader (BCR). Furthermore, the binary coding circuit of the invention can be effectively utilized for improving the stability of operation of a hand-held POS (point of sale) terminal, OCR or BCR.

What is claimed is:

1. A binary coding circuit for binary coding an output of a photoelectric conversion element in an optical character reading unit which optically reads characters, said coding circuit comprising:
   a parent signal generating circuit receiving an output of said photoelectric conversion element and generating a binary coding parent signal and a threshold parent signal;
   a binary coding signal amplifier circuit group to which said binary coding parent signal is applied, said binary coding signal amplifier circuit comprising N amplifier circuits, where N is a positive integer, having different amplification factors and different offset levels;
   a threshold signal amplifier circuit group to which said threshold parent signal is applied, said threshold signal amplifier circuit group comprising M amplifier circuits, where M is a positive integer, having different amplification factors and different offset levels; and
   a comparison circuit group comprising L comparison circuits, where L is a positive integer satisfying MAX (M, N)$\leq$L$\leq$MN, in each of which an output of a respective one of said amplifier circuits in said binary coding signal, amplifier circuit group and a respective one of the outputs of said amplifier circuits in said threshold signal amplifier circuit group are subjected to comparison to provide a binary coded signal.

2. The binary coded circuit of claim 1, wherein said parent signal generating circuit comprises: a first delay element receiving as an input an output signal from said photoelectric conversion element, an output of said first delay element being said binary coding parent signal, a second delay element having an input connected to said output of said first delay element, and an OR circuit receiving as inputs said output signal from said photoelectric conversion element and an output of said second delay element, an output of said OR circuit being said threshold parent signal.

3. The binary coded circuit of claim 2, wherein said OR circuit comprises: a first amplifier receiving as an input said output signal from said photoelectric conversion element, a second amplifier receiving as an input said output of said second delay element, first and second diodes having like first terminals connected to outputs of said first and second amplifiers, respectively, and a resistor connected between commonly connected second terminals of, said first and second diodes and a reference point.

* * * * *